INVENTORS
SAMUEL E. JOLLY
EDWARD M. KOHN
BY JOHN D. TENCH

W. E. McCorquodale, Jr.
ATTORNEY

United States Patent Office 3,681,117
Patented Aug. 1, 1972

3,681,117
VINYLIDENE RESIN/COATED SUBSTRATUM HAVING A UNIFORM OUTER WAX COATING
Samuel E. Jolly, Ridley Park, Edward M. Kohn, Philadelphia, and John D. Tench, Springfield, Pa., assignors to Sun Oil Company of Pennsylvania, Philadelphia, Pa.
Filed Oct. 21, 1970, Ser. No. 82,792
Int. Cl. B32b 27/30; B44d 1/16
U.S. Cl. 117—75                 7 Claims

ABSTRACT OF THE DISCLOSURE

A petroleum wax coating, which covers the entire area of a vinylidene resin coated substratum as an outer layer of uniform thickness, is obtained by the addition of a small amount of an ester or mixture of esters of a fatty acid and a polyhydric alcohol to the wax before application.

BACKGROUND OF THE INVENTION

The present invention provides a method for applying petroleum waxes to a vinylidene resin coated substratum. This method produces a continuous outer petroleum wax coating of uniform thickness thereby yielding a multi-layer enclosing material with improved sealability and slip protection. The invention also embraces the multi-layer product produced by this method.

Substrata, such as papers, cellophanes, metallic films polymeric films, are coated with petroleum waxes and the resulting multi-layer products are used for many purposes, one being as a protective wrapping. This wax-coated substratum often has less than the desired water vapor and gas transmission protection. This deficiency can be corrected by applying a layer of vinylidene resin to the substratum. However, to maintain the other desirable properties that the wax-coated substratum had, such as adequate sealability, an outer wax coating has to be applied to the vinylidene resin coated base. This wax coating also provides slip protection for the vinylidene resin layer, i.e., it reduces damage to the vinylidene resin layer caused by friction between the wrapping and the protected product.

However, when petroleum wax is applied to a vinylidene resin coated base, the wax solidifies in a non-uniform layer. This problem is discussed in greater detail hereinafter.

SUMMARY OF THE INVENTION

The present invention provides a process for coating a vinylidene resin coated substratum with petroleum waxes, which method produces a continuous outer wax coating covering the entire surface area with an even thickness. The invention also embraces the multi-layer products produced by the present method.

According to the invention, the uniform wax coating is obtained by the addition of a small quantity of an ester or mixture of esters of a $C_8$–$C_{30}$ fatty or naphthenic acid with a polyhydric alcohol having 2 to 5 carbon atoms and 2 to 3 hydroxyl groups to the wax and thereafter coating the vinylidene resin coated base with the petroleum wax. This procedure is applicable to both the paraffin waxes and the microcrystalline waxes, as well as to mixtures of paraffin waxes and microcrystalline waxes. The mechanism by which this improvement results is not fully understood at present.

DESCRIPTION OF THE INVENTION

Figure 1A:
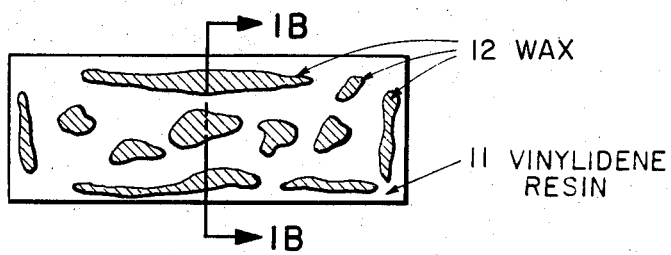
FIGS. 1A and 1B are, respectively, plan and cross-sectional views (the latter being taken on line 1B—1B of FIG. 1A), illustrating a laminated article comprising a vinylidene resin coated substratum which has been coated with wax alone.
Figure 1B:
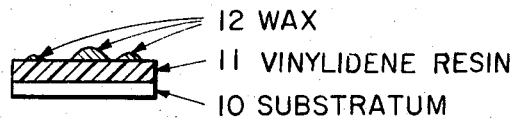
Figure 2A:
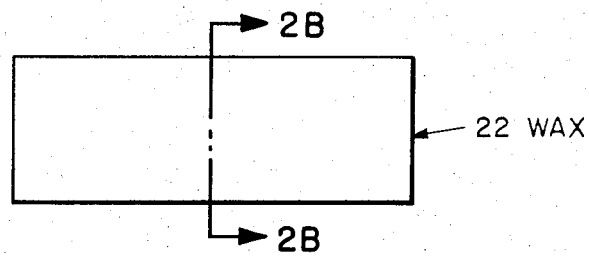
FIGS. 2A and 2B are, respectively, plan cross-sectional views (the latter taken on line 2B—2B of FIG. 2A) illustrating the same kind of article, but which has been wax coated in accordance with the present invention.
Figure 2B:
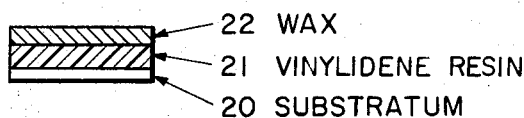

As illustrated in FIGS. 1A and 1B, a laminated article comprising a substratum 10 carrying a vinylidene resin coating 11 to which wax alone has been applied will have a non-uniform and discontinuous wax coating illustrated by shaded areas 12. However, as shown in FIGS. 2A and 2B, an article prepared in accordance with the invention and comprising substratum 20 with a vinylidene resin coating 21 will have a continuous uniform wax coating illustrated by numeral 22.

In practicing the invention, wax, which is applied as an outer coat to a vinylidene resin coated substratum, has incorporated into it a small amount of an ester or mixture of esters from a fatty or naphthenic acid and a polyhydric alcohol. The ester, used in this invention, can be a reaction product between (1) a fatty acid having 8 to 30 carbon atoms and a polyhydric alcohol containing 2 to 5 carbon atoms and 2 to 3 hydroxyl groups or (2) naphthenic acids having 8 to 30 carbon atoms and the specified alcohol. Fatty acids refer to aliphatic monocarboxylic acids, both saturated and unsaturated, such as caprylic, n-nonadecylic, melissic, obtusilic, oleic, hiragonic, moroctic, stearolic, etc., but such acids as palmitic, stearic, oleic and linoleic are commercially available and, therefore, their esters are preferred in practicing the invention. Of the naphthenic acid esters those of petroleum naphthenic acids are preferred but esters of other naphthenic acids such as cyclohexylacetic acid or decahydronaphthalene carboxylic acids also can be used. Ethylene glycol, propylene glycol and glycerol are the preferred polyhydric alcohols; however, others such as 1,4-butanediol, 1,5-pentanediol, 1,2,4-butanetriol, etc. can be used to prepare the ester additive.

A more specific group of the esters previously discussed are the glycerides, the manufacture of which is discussed in Kirk-Othmer, Encyclopedia of Chemical Technology, copyright 1965, 2nd edition, vol. 8. A mixture of mono-, di- and tri-glycerides is formed from the glycerol esterification of fatty acids. The maximum concentration of the monoglyceride in the mixture after removal of the reactants and by-products but without further processing is about 60% by weight. A monoglyceride fraction with a monoester concentration of about 90% by weight can be obtained by molecular distillation. While a glyceride with a monoester content of about 90% by weight is used to illustrate the invention, lower monoester contents will work almost as well. The level of purity depends, in part, on whether the wax-coated article is intended to be used on contact with food.

When this invention is used to prepare a wax surface that is to be in contact with food, it is distinctly preferable that the fatty acid group of the glyceride, for example, be derived from an edible fat, since it will be harmless in case any of the monoglyceride seeps into the food product. An example of such a monoglyceride is glycerol monooleate.

The glycerol monooleate or other ester as above specified is incorporated in the wax by mixing a small amount of it with molten wax. While the proportion of ester incorporated in the wax can range from about 0.01% to about 5.0% by weight, generally the range will be from about 0.05% to 0.50% by weight.

Petroleum wax is commercially available with a wide range of physical properties. Paraffin waxes are available with AMP melting points from about 127° F. to 156° F.

and oil contents from about 0.1 to about 1.2% (ASTM D-721). Microcrystalline waxes are available with melting points (ASTM D-127) from about 151° F. to about 195° F. and oil contents from about 0.4 to about 1.5% (ASTM D-721). While certain petroleum wax fractions are known to have better characteristics for coating different kinds of substrata, our invention can be used with any petroleum wax fraction being applied to vinylidene resin coated base.

Many kinds of base materials can be coated with vinylidene resin. Among these are paper including glassine, sulfite, kraft, baseboard; cellophane; metallic foils such as aluminum foil; polymers such as polyethylene, polypropylene and polystyrene. In our example a vinylidene resin coated glassine is used to demonstrate the principle of our invention; it will work equally well on other kinds of vinylidene resin coated substrata. Vinylidene resin herein refers to thermoplastic resins obtained by the polymerization of vinylidene chloride or copolymerization of vinylidene chloride with lesser amounts of other unsaturated compounds such as vinyl chloride or acrylonitrile.

Glassine coated with petroleum wax is used as a liner inside breakfast cereal boxes and on baked pastries. Wax-coated glassine, however, has less than the desired water vapor and gas transmission protection. This deficiency can be corrected by applying a thin coating of vinylidene resin to glassine. However, to maintain the other desirable properties that the waxed glassine had, such as adequate sealability, a wax coating has to be applied to the vinylidene resin laminated paper. This wax coating also provides slip protection for the vinylidene resin layer.

The following comparison illustrates the improvements that can be effected by the present invention:

Two beakers were placed in an oven at 165° F. One of the beakers contained 240 grams of a paraffin wax with a melting point of 143° F. (AMP method); oil content of 0.3% (ASTM D-721); +28 color Saybolt (ASTM D-156); 39.8 viscosity, SUS at 210° F. (ASTM D-446); 4.1 viscosity kinematic at 210° F. (ASTM D-445); 0.924 specific gravity at 60° F.; 0.761 specific gravity at 212° F. (ASTM D-287). A second beaker contained 240 grams of said paraffin wax and, in addition, 240 milligrams (0.1%) of glycerol monooleate. This monooleate had a minimum monoester content of 90.0%; saponification value of 155–165, iodine value 65–70, a maximum glycerol content of 1.0%, a maximum free fatty acid content of 1.5% (as oleic), a specific gravity of 0.95–0.96 at 40° C. and a melting point of 29° C. to 35° C.

Strips of vinylidene resin coated glassine (28# paper with vinylidene resin coating on one side) were coated hot on both sides with just wax and then drawn between equalizer rods spaced apart enough to permit a thin deposit of wax to remain on the paper. The condition of these strips is represented by FIG. 1A. As indicated therein, the wax almost immedaitely collects in long ridges and blotches on the middle of the specimen (shaded areas 12 of FIGS. 1A and 1B). As shown, not all the vinylidene resin coated base is coated with wax, and also the thickness of the wax areas on the paper is not uniform.

The above procedure was repeated with the wax containing 0.1% by weight of glycerol monooleate. As shown in FIGS. 2A and 2B, a wax coating was formed over the entire paper as an outer layer 22 of uniform thickness.

Comparison of FIGS. 1A and 1B with FIGS. 2A and 2B shows that the addition of a small quantity of glycerol monooleate prevents the wax from forming in ridges and blotches on the vinylidene resin coated paper. The advantage of the invention is twofold: (1) the entire area of the vinylidene resin coated paper is coated with wax; and (2) an even thickness of wax exists on the entire surface of multi-layer paper.

While in this example a paper coated on one side with vinylidene resin is used, the invention is equally applicable to substrata coated with vinylidene resin on both sides.

Substantially equivalent results, as in the above specific example, are obtained when (1) other petroleum waxes are used and/or (2) other esters as herein specified including mono-, di- and triesters of other $C_8$–$C_{30}$ fatty acids or of $C_8$–$C_{30}$ naphthenic acids with $C_2$–$C_5$ polyhydric alcohols having 2 to 3 hydroxyl groups or mixtures of such esters.

We claim:

1. An article of manufacture comprising a vinylidene resin coated substratum, said substratum being paper, metallic film or polymeric film, having applied thereto a uniform outer coating consisting principally of petroleum wax containing from 0.01% to 5.0% by weight of an ester or mixture of esters of a $C_8$–$C_{30}$ fatty or naphthenic acid with a polyhydric alcohol having 2 to 5 carbon atoms and 2 to 3 hydroxyl groups.

2. Article according to claim 1 wherein said acid is a fatty acid.

3. Article according to claim 2 wherein said alcohol has 2 to 3 carbon atoms.

4. Article according to claim 3 wherein the wax contains a mixture of esters having at least 60% by weight of a monoester.

5. Article according to claim 4 wherein said ester or mixture of esters is present in the wax in the amount of about 0.05% to about 0.5% by weight.

6. Article according to claim 1 wherein said acid is petroleum naphthenic acid and said polyhydric alcohol has 2 to 3 carbon atoms.

7. Article according to claim 6 wherein said ester or mixture of esters is present in the wax in the amount of about 0.05% to about 0.5% by weight.

References Cited

UNITED STATES PATENTS

| | | | |
|---|---|---|---|
| 3,400,008 | 9/1968 | Bleyle et al. | 117—92 X |
| 3,455,726 | 7/1969 | Mitchell et al. | 117—76 P |
| 3,458,346 | 7/1969 | Mitchell et al. | 117—76 P |
| 3,200,005 | 8/1965 | Bauer | 117—76 P |
| 3,598,634 | 8/1971 | Kraft | 117—92 X |

RALPH HUSACK, Primary Examiner

U.S. Cl. X.R.

99—171 LP; 117—45, 76 P, F, 89, 90, 92, 132 C, 138.8 E, UA, 155 UA